US010275390B2

(12) United States Patent
Metzgen

(10) Patent No.: US 10,275,390 B2
(45) Date of Patent: Apr. 30, 2019

(54) PIPELINED CONFIGURABLE PROCESSOR

(71) Applicant: Silicon Tailor Limited, London (GB)

(72) Inventor: Paul Metzgen, London (GB)

(73) Assignee: Silicon Tailor Limited, Putney, London ( * ) Notice: Subject to any disclaimer, the term of this patent is extended or adjusted under 35 U.S.C. 154(b) by 0 days.

(21) Appl. No.: 15/600,508

(22) Filed: May 19, 2017

(65) Prior Publication Data

US 2018/0089140 A1 Mar. 29, 2018

Related U.S. Application Data

(63) Continuation of application No. 15/033,459, filed as application No. PCT/GB2014/053200 on Oct. 28, 2014, now Pat. No. 9,658,985.

(30) Foreign Application Priority Data

Oct. 31, 2013 (GB) .................................. 1319279.4

(51) Int. Cl.
*H03K 19/173* (2006.01)
*G06F 15/78* (2006.01)
(Continued)

(52) U.S. Cl.
CPC ............ *G06F 15/7867* (2013.01); *G06F 1/10* (2013.01); *G06F 9/3851* (2013.01);
(Continued)

(58) Field of Classification Search
CPC ......... H03K 19/17736; H03K 19/1774; H03K 19/17748; G06F 9/3826; G06F 9/3828;
(Continued)

(56) References Cited

U.S. PATENT DOCUMENTS 6,282,627 B1    8/2001 Wong et al.
6,349,346 B1    2/2002 Hanrahan et al.
(Continued)

FOREIGN PATENT DOCUMENTS

CN    101546255 A    9/2009
CN    101821712 A    9/2010
(Continued)

OTHER PUBLICATIONS

Combined Search and Examination Report, GB1319279.4, dated Nov. 26, 2014, 6 pages.
(Continued)

*Primary Examiner* — Jason Crawford
(74) *Attorney, Agent, or Firm* — Fish & Richardson P.C.

(57) ABSTRACT

A configurable processing circuit capable of handling multiple threads simultaneously, the circuit comprising a thread data store, a plurality of configurable execution units, a configurable routing network for connecting locations in the thread data store to the execution units, a configuration data store for storing configuration instances that each define a configuration of the routing network and a configuration of one or more of the plurality of execution units, and a pipeline formed from the execution units, the routing network and the thread data store that comprises a plurality of pipeline sections configured such that each thread propagates from one pipeline section to the next at each clock cycle, the circuit being configured to: (i) associate each thread with a configuration instance; and (ii) configure each of the plurality of pipeline sections for each clock cycle to be in accordance with the configuration instance associated with the respective thread that will propagate through that pipeline section during the clock cycle.

20 Claims, 6 Drawing Sheets

(51) Int. Cl.
*G06F 9/38* (2018.01)
*G06F 1/10* (2006.01)

(52) U.S. Cl.
CPC .......... *G06F 9/3869* (2013.01); *G06F 9/3873* (2013.01); *G06F 9/3897* (2013.01); *G06F 15/7878* (2013.01)

(58) Field of Classification Search
CPC .. G06F 9/3851; G06F 9/3867; G06F 15/7867; G06F 15/7878
USPC .............................................. 326/37–41, 47
See application file for complete search history.

(56) References Cited

U.S. PATENT DOCUMENTS

| | | | |
|---|---|---|---|
| 6,759,869 B1 * | 7/2004 | Young | H03K 19/17736 326/38 |
| 6,940,308 B2 | 9/2005 | Wong | |
| 7,149,996 B1 * | 12/2006 | Lysaght | H04Q 3/54533 326/38 |
| 7,276,933 B1 | 10/2007 | Teig et al. | |
| 7,482,836 B2 * | 1/2009 | Levi | H03K 19/17736 326/38 |
| 7,768,301 B2 * | 8/2010 | Lepape | G06F 15/7867 326/41 |
| 7,825,685 B2 * | 11/2010 | Chandler | G06F 15/7867 326/38 |
| 8,006,073 B1 | 8/2011 | Ali | |
| 8,493,090 B1 | 7/2013 | Trimberger | |
| 9,166,928 B2 * | 10/2015 | Lea | H04L 49/1515 |
| 9,658,985 B2 * | 5/2017 | Metzgen | G06F 9/3851 |
| 2004/0073772 A1 | 4/2004 | Hokenek et al. | |
| 2004/0150422 A1 | 8/2004 | Wong | |
| 2005/0120194 A1 | 6/2005 | Kissell | |
| 2005/0177703 A1 | 8/2005 | Norden et al. | |
| 2006/0004942 A1 | 1/2006 | Hetherington | |
| 2009/0037916 A1 | 2/2009 | Morishita et al. | |
| 2009/0070602 A1 | 3/2009 | Ingle et al. | |
| 2009/0073967 A1 | 3/2009 | How et al. | |
| 2009/0300336 A1 | 12/2009 | Wang et al. | |
| 2010/0122105 A1 | 5/2010 | Arslan et al. | |
| 2010/0272117 A1 | 10/2010 | Wu et al. | |
| 2010/0299508 A1 | 11/2010 | Luttrell | |
| 2011/0276760 A1 | 11/2011 | Chou | |
| 2012/0159062 A1 | 6/2012 | Aybay | |
| 2012/0284379 A1 | 11/2012 | Zievers | |
| 2013/0013902 A1 | 1/2013 | Isomura et al. | |

FOREIGN PATENT DOCUMENTS

| | | |
|---|---|---|
| JP | A-2006-502507 | 1/2006 |
| JP | A-2006-40254 | 2/2006 |
| JP | A-2007-504536 | 3/2007 |
| JP | A-2008-539485 | 11/2008 |
| JP | WO-2006-109835 | 11/2008 |
| JP | A-2010-146102 | 7/2010 |
| JP | A-2011-522317 | 7/2011 |

OTHER PUBLICATIONS

International Search Report and Written Opinion, PCT/GB2014/053200, dated Apr. 23, 2015, 15 pages.
Search Report, GB1513909.0, dated Sep. 4, 2015, 4 pages.
Search Report, GB1513909.0, dated Nov. 12, 2015, 2 pages.
International Preliminary Report on Patentability for corresponding Appl No. PCT/GB2014/053200, dated May 3, 2016, 10 pages.
Chinese Office Action and Search Report, with translation thereof, for corresponding CN Appl No. 201480070217.8, dated Jun. 27, 2018.
Japanese Office Action, with translation thereof, for corresponding Appl No. 2016-551066, dated Dec. 5, 2018.
Hideharu Amano et al., "A configuration control mechanism for a dynamically reconfigurable processor", IEICE Technical Report, The Institute of Electronics, Information and Communication Engineers, Sep. 8, 2006, vol. 106, No.247 (RECONF 2006-27 to 37), pp. 19-24. (Abstract only).

* cited by examiner

PIPELINED CONFIGURABLE PROCESSOR

CROSS-REFERENCE TO RELATED APPLICATIONS

The present application is a continuation of, and claims benefit under 35 USC 120 to, U.S. application Ser. No. 15/033,459, filed Apr. 29, 2016, now U.S. Pat. No. 9,658,985, which is a national stage of and claims priority under 35 U.S.C. § 371 to PCT Application No. PCT/GB2014/053200, filed on Oct. 28, 2014, which claims priority to UK Application No. 1319279.4, filed on Oct. 31, 2013. The contents of these priority applications are hereby incorporated by reference in their entirety.

This invention relates to a processor design for an integrated circuit.

An integrated circuit typically comprises a large number of function units connected together by interconnect circuits. Sometimes the function units and interconnect circuits are configurable. This means the function units can be programmed to adopt a particular behaviour and the interconnect circuits can be programmed to connect different parts of the circuit together. A well-known example of a configurable circuit is an FPGA (field programmable gate array), which is programmable by a user to perform a wide-range of different functions. Other examples of configurable integrated circuits are described in U.S. Pat. No. 7,276,933, U.S. Pat. No. 8,493,090 and U.S. Pat. No. 6,282,627.

In many configurable circuits there is a trade-off between speed and flexibility. For maximum flexibility, it is desirable to be able to connect together as many different combinations of the function units as possible. This can require long interconnect paths if execution units are spaced across the chip. In general an integrated circuit cannot be clocked faster than the longest operation it might perform in a single clock period. The delay due to interconnect often dominates any delay due to the function units, so the time taken to transfer data over a long interconnect path is a constraint that can ultimately limit the clock speed of the entire circuit.

One option for placing an upper limit on time delays in an integrated circuit is to limit the length of all interconnect paths that will be traversed in one clock period. This can be achieved by pipelining data as it travels around the integrated circuit. An example is described in U.S. Pat. No. 6,940,308, in which the inputs to switch cells in the interconnect network have latches to pipeline data as it is routed through the interconnect network. An issue with this approach is that the user's design may need to be modified to incorporate the required latches.

Therefore, there is a need for an improved flexible processing circuit.

According to one embodiment, there is provided a configurable processing circuit capable of handling multiple threads simultaneously, the circuit comprising a thread data store, a plurality of configurable execution units, a configurable routing network for connecting the thread data store to the execution units, a configuration data store for storing configuration instances that each define a configuration of the routing network and a configuration of one or more of the plurality of execution units and a pipeline formed from the execution units, the routing network and the thread data store that comprises a plurality of pipeline sections configured such that each thread propagates from one pipeline section to the next at each clock cycle, the circuit being configured to: (i) associate each thread with a configuration instance; and (ii) configure each of the plurality of pipeline sections for each clock cycle to be in accordance with the configuration instance associated with the respective thread that will propagate through that pipeline section during the clock cycle.

The circuit may be configured to associate each configuration instance with a configuration identifier.

The circuit may be configured to propagate the configuration identifier associated with a thread through the pipeline in coordination with that thread.

The configuration data store may comprise a plurality of memories and the circuit may be configured to partition the configuration instances across said plurality of memories so that each memory stores parts of the configuration instances applicable to a particular pipeline section.

Each pipeline section may be configured to access a configuration instance by accessing the memory that stores the parts of the configuration instances that are applicable to it.

Each section of the pipeline may be configured to use the configuration identifier associated with a thread to access the configuration instance associated with that thread in the configuration data store.

The multiple threads may be independent.

The circuit may be configured to associate more than one thread with the same configuration identifier The circuit may be capable of changing the configuration identifier that is associated with a thread so that the thread follows a different configuration on one pass through the circuit than on a second, subsequent pass through the circuit.

The circuit may be configured to change the configuration identifier in dependence on an output generated by one of the execution units when operating on an input associated with the thread.

The configurable routing network may comprise a plurality of network inputs and a plurality of network outputs and may be configurable to connect each network input to a network output.

The configurable routing network may be capable of connecting any network input to any network output.

The configurable routing network may be capable of connecting any network input to any one or more of the network outputs.

The outputs of the configurable routing network may be connected to inputs of the execution units.

The configurable routing network may comprise a multistage switch.

The multistage switch may comprise, at each stage, one or more switches, each switch having multiple switch inputs and multiple switch outputs and being configurable to connect each switch input to a switch output.

The switches in every stage of the multistage switch may comprise the same number of switch inputs and switch outputs.

The switches comprised in one stage of the multistage switch may comprise a different number of switch inputs and switch outputs from the switches comprised in another stage.

The pipeline section being may be formed from the switches comprised in one or more stages of the multistage switch.

A pipeline section formed from switches in an inner stage of the multistage switch may comprise switches from a different number of stages of the multistage switch than a pipeline section formed from switches comprised in an outer stage of the multistage switch.

The configurable routing network may comprise a Clos network.

The configurable routing network comprising one or more crossbar switches.

The configurable routing network may be non-blocking.

The configurable routing network may be fully configurable.

The configurable routing network may be partially configurable.

The circuit may comprise dedicated on-chip memory for each execution unit.

The circuit may comprise a check unit for checking that data stored in the thread data stores is valid.

The check unit may be configured to, if it identifies invalid data, suspend the execution units from writing to the thread data store and/or performing memory access operations when they are operating on a thread that has read the invalid data.

The circuit may be configured so that a thread that has read invalid data will be associated with the same state on its next pass through the circuit.

A location in the thread data stores may be associated with two valid bits.

The configurable routing network may comprise datapaths that are multiple bits wide for carrying data read from the thread data stores.

The circuit may comprise two configurable routing networks, one of said configurable routing networks comprising wider datapaths than the other.

The circuit may comprise a fracturable execution unit.

The circuit may comprise an execution unit configured such that its inputs are commutable. The configurable routing network may be configured to connect the thread data store to execution unit commutable inputs and to execution unit non-commutable inputs, the outermost stage of the configurable routing network may comprise a first number of switches that are configured connect the thread data store to the execution unit commutable inputs and a second number of switches that are configured to connect the thread data store to the execution unit non-commutable inputs, and said first number may be less per connected input than said second number.

The circuit may be capable of dynamic reconfiguration.

According to a second embodiment of the invention, there is provided a method for handling multiple threads simultaneously in a configurable processing circuit that comprises a thread data store, a plurality of configurable execution units, a configurable routing network for connecting the thread data store to the execution units, and a pipeline formed from the execution units, the routing network and the thread data store that comprises a plurality of pipeline sections, the method comprising associating each thread with a configuration instance that defines a configuration of the routing network and a configuration of one or more of the plurality of execution units, causing each thread to propagate from one pipeline section to the next at each clock cycle and configuring each of the plurality of pipeline sections for each clock cycle so that each pipeline section is configured in accordance with the configuration instance associated with the respective thread that will propagate through that pipeline section during the clock cycle.

The present invention will now be described by way of example with reference to the accompanying drawings. In the drawings.

A configurable processing circuit is preferably capable of handling multiple threads at the same time. The circuit comprises a thread data store, one or more configurable routing networks and a number of configurable execution units. Values from the data stores are read and then routed through the routing network to the execution units. The executions units perform operations on these values and deliver new values at their outputs. The outputs of execution units are written back to the data stores.

The circuit also comprises a pipeline. The pipeline is formed from the data stores, the routing network and the execution units. It comprises a plurality of pipeline sections so that each thread propagates from one pipeline section to the next at each clock cycle. The circuit is preferably arranged to configure the pipeline sections for each clock cycle to suit the thread they are handling at the time. A thread's configuration can be thought of as "clocking through" the circuit with the thread so that each thread's data is steered on its own particular path through the processing circuit.

The circuit also comprises on-chip memories to hold a plurality of configuration instances. The circuit is configured to select which locations in the data store to read from, and which locations in the data store the execution units write to, in dependence on the configuration instances. The circuit is also configured to set out the routes taken through the routing network and control the behaviour of the execution units using the configuration instances. Each configuration instance can be uniquely referred to by a configuration instance identifier. The circuit may be configured to select which configuration instance to use for a thread by associating that thread with a particular configuration instance identifier.

With the advent of GPUs (graphics processing unit), programmers have become accustomed to solving computational problems using a large number of threads whose interaction with each other is low. These largely independent threads are ideally suited to being processed by the multi-threaded, reconfigurable processor described herein. GPUs are often constructed from a plurality of identical processors, which is termed homogeneous computing. Unlike a GPU, the circuit described herein permits a plurality of different execution units, which is a form of heterogeneous computing. The number and capabilities of the execution units in a particular instance of the circuit can be chosen to suit certain classes of problems. This leads to a more efficient implementation of any given task compared to a GPU.

Circuit Overview

Figure 1:
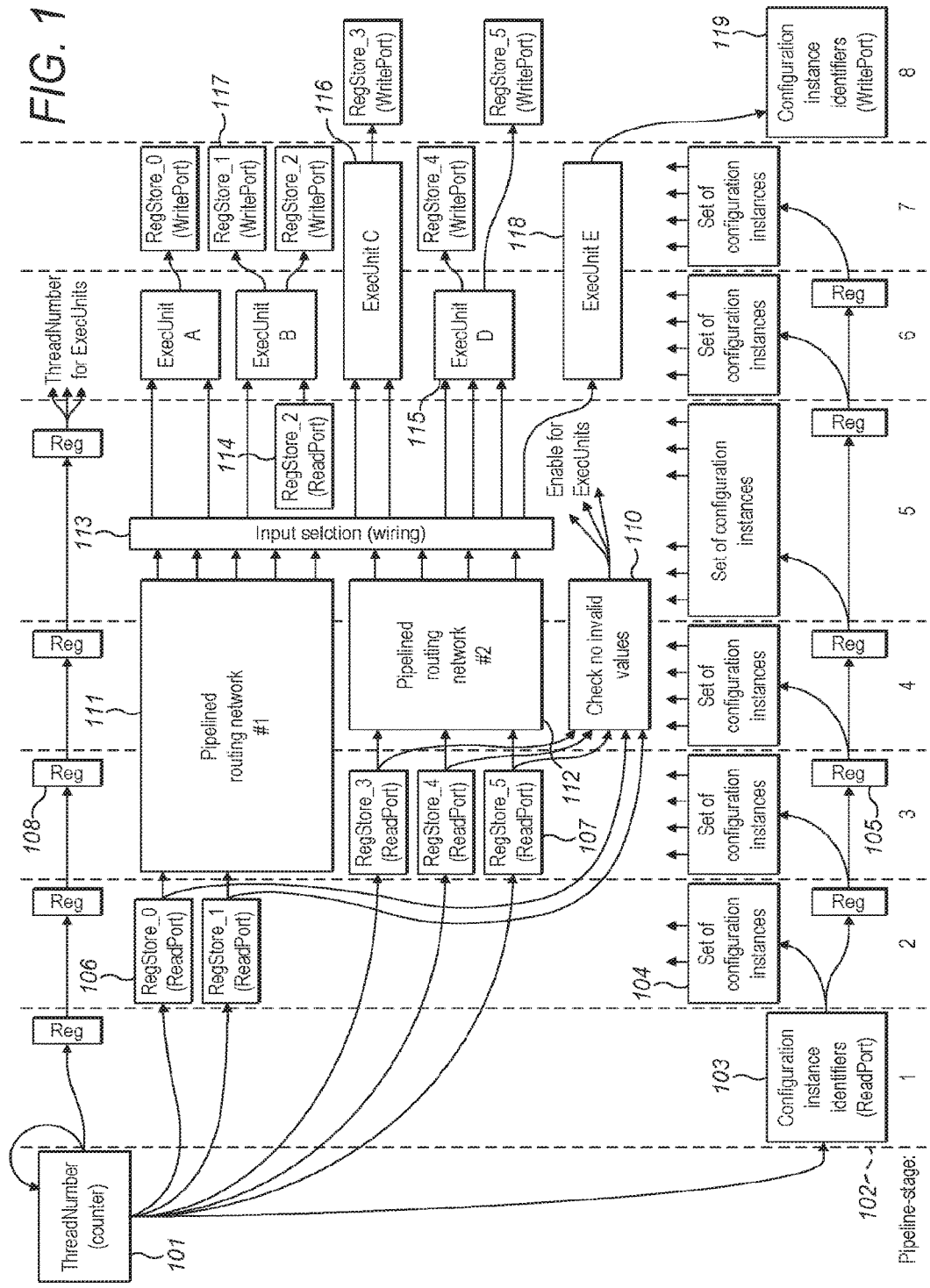
FIG. 1 shows an example of a configurable processing circuit.

An example of a configurable processing circuit is shown in FIG. 1. The circuit comprises a configurable routing network (implemented in this example as two routing networks, 111, 112). The circuit also includes a number of configurable execution units (115, 116). The circuit is pipelined, which is represented in the figure by dotted lines 102. In the example shown the pipeline consists of 8 stages, as indicated by the numbers along the bottom of the figure. The boundaries between pipeline sections are suitably chosen to limit the longest time taken in any pipeline section in order to accommodate the maximum clock speed.

The description below assumes that it is the rising clock edges that trigger the propagation of threads through the pipeline. It should be understood that this is for the purposes of example only and falling clock edges could equally be used. Equally a mixture of rising and falling edges could be used across the pipeline. Each pipeline stage could have its own clock (provided that those clocks are synchronised so that clock edges occur at the same time in every pipeline stage).

The circuit is configured to handle multiple threads at the same time. A thread in hardware is commonly considered to be a sequence of actions that execute independently from other threads. In addition, threads often have some state that is only available to that thread. A thread is usually contained within a process. A process may contain multiple threads. Threads that exist within the same process can share resources such as memory.

The thread counter 101 causes a new thread to enter the circuit at each clock cycle. In some situations the new thread may be a repeat of a thread that has just finished propagating through the pipeline. The thread number may be propagated from one pipeline section to the next at each clock cycle. One option for propagating the thread number is to have a register 108 in each pipeline section for storing the thread number for the thread currently in that pipeline section.

The thread counter may itself be configurable. Typically it would be configured by an external processor, for instance to change the sequence and/or the sequence length.

Each configuration instance may contain thousands of bits. In this example, each instance is associated with an identifier that consists of many fewer bits than the configuration instance and thus acts as a convenient shorthand. The first stage in the pipeline is configured to lookup the configuration instance identifier that the current thread will use from the register store (103). The configuration instance identifier will be propagated through the pipeline using registers (105). The configuration instance identifier is used at each pipeline stage to lookup the parts of the configuration instance that are needed for that pipeline stage. This may be achieved by partitioning the configuration instance into separate on-chip memories for each pipeline stage (104). A pipeline stage retrieves the configuration instance that it needs for a particular thread by looking up the thread's configuration identifier in its particular section of memory. As each thread travels through the pipeline, it only sees the configuration instance associated with its configuration instance identifier.

The on chip memories containing the configuration instances are shared between the threads so that any thread can use any configuration instance. One thread can use the same configuration instance as another. Threads can use different configuration instances. In many instances a thread may use a completely different configuration instance from the thread preceding it through the circuit. It is therefore possible (and indeed likely) that multiple configuration instances will be active in the circuit at any one time. Execution of a thread may change which configuration instance identifier (and hence which configuration instance) it will use on the next pass through the circuit.

The thread number and some configuration instance bits are used to access values from a data store, which in this example are conveniently implemented by register stores (106). In one embodiment of the invention, threads cannot access values in the register stores used by other threads. The register store values enter data routing network 111 in the following clock cycle. The data routing network is capable of routing the values to particular execution units. The data routing network is configurable: at least some of the switching through the routing network can be changed from one clock cycle to the next. The switching that each input sees as it propagates from one pipelined stage of the routing network to the next is determined by the configuration instance derived from the configuration instance identifier that follows it through the network.

The datapaths through the data routing networks are preferably multiple bits wide. The exact width of the data path can be tailored for a particular application. The datapaths through any given routing network need not all be of the same width. For example, some parts of the datapaths could accommodate wider inputs than the others. This may limit the flexibility of the routing in some situations: inputs would need to be routed via the parts of the datapath that are wide enough, which could restrict the routes available to other inputs of a thread. The inputs do not need to utilise the full width of the data paths but the network outputs should be able to accommodate a number of bits equal to the widest path through the data routing network.

In some embodiments of the invention it is convenient to have a number of separate routing networks rather than a single monolithic routing network. In one embodiment of the invention control values and data values are separated each having their own set of register stores (106 and 107) and routing network (111 and 112). In one example the routing network (111) may comprise datapaths that are only one-bit wide for control values, and another routing network (112) may comprise datapaths that are 32-bits wide for data values. The size of a routing network is determined by the number of inputs and outputs, and so different routing networks may need different pipeline depths. The routing networks in FIG. 1 are only shown with one or two pipeline stages. In practice a routing network may typically have a dozen or so pipeline stages.

An input selection unit connects each output from a routing network to an input of an execution unit (115). The execution units are configurable so the exact operation that they perform on their input is determined by bits from the configuration instance. The exact operation performed by the execution units could also be determined by one or more bits from the thread data (e.g. control values comprised in that data). Typically an execution unit will form a single section of the pipeline but some execution units may be configured to perform longer operations, requiring more than one clock cycle (116), and these execution units may form two or more pipeline sections. Similarly execution units may be chained together at the end of the pipeline so that a thread may propagate from one execution unit to another (not shown).

Each execution unit may write result values to register stores (117) to which they can write. Each register store is only written to by one execution unit. Execution units may write to more than one register store. Some execution units can read and write to a common shared resource (such as external memory). Reading and writing to shared resources (whether on-chip or external) is likely to be a variable latency operation that can take longer than a single clock cycle.

Some register locations in some register stores may be associated with valid bits that assert whether the data stored in that location is valid or not. Typically only register stores associated with variable latency execution units need to have the extra bits to mark each location as valid or invalid. Other register stores may always considered to hold valid values.

The valid bits may be set to "invalid" at the start of a write operation and only returned to "valid" when the write operation is complete. The circuit may incorporate means for confirming that a register location that a thread will want to read from is valid before that thread reaches the execution units (110). These means may efficiently be arranged in the same pipeline sections as the routing networks. This role may be performed by a check unit configured to read the appropriate valid bits for a thread before it enters the execution units. The check unit may disable all execution units that will be operating on invalid data (or at least disable them from performing memory writes and register store writes) when the thread enters those execution units. This prevents the results of operations performed on "invalid" data from being written to the registers or other memory.

In one example, two valid bits are allocated to each register store location that needs them. The data stored in a register store location may be considered invalid if the two valid bits are different and valid if the two bits are the same (or vice versa). Having two valid bits enables them to be written to by two different pipeline stages at the same time. Typically a pipeline stage that wants to invalidate data in the register store will be configured to flip one of the valid bits and another pipeline stage that validate data in the register store will be configured to flip the other of the valid bits.

An execution unit (118) can also change the configuration instance that a particular thread will use on another pass through the circuit by changing the configuration instance identifier associated with that thread (119). The new configuration instance identifier will be used for the thread on its next pass through the circuit.

An execution unit will sometimes be required to perform operations that are based on the results from previous executions of a thread. An example is an accumulate operation. The circuit may comprise one or more units dedicated to performing such operations. An example might be an accumulate register store. These register stores (eg: 114) do not need to go through the routing network, which can reduce the size of routing network required.

The execution units typically do not have any feedback within themselves. Feedback is achieved on a circuit-wide basis by the execution of one thread changing data stored in the register stores or external memory and/or changing the thread's configuration instance identifier Register Stores Each register store contains a plurality of locations that store separate values. The circuit may choose a location using a register store address. In one embodiment of the invention threads access separate sets of locations in each register store. This can be implemented by ensuring that part of the read and write addresses to register stores are based on the thread number (at the appropriate pipeline stage) as well as zero or more configuration instance bits. In this embodiment, threads cannot access values held in register stores associated with another thread.

As a register store is usually read from and written to in different pipeline stages, the read and write addresses to that register store in any given clock cycle will often be different. Hence register stores may be advantageously implemented in on-chip memory that is able to perform separate read and write operations in one clock cycle.

Routing Networks

The routing network is essentially a switch for connecting multiple inputs to multiple outputs. Inputs may be connected to single outputs or to multiple outputs. The routing network is preferably configurable, so that at least some of its switching can be set clock-cycle by clock-cycle by bits from the configuration instance.

The routing network may be able to connect any input to any output (and in some embodiments, to more than one output). The routing network may also be non-blocking, so that the inputs can be connected to the outputs in any combination.

One example of a suitable switch for implementing a configurable routing network is a crossbar switch. The term "crossbar switch" is sometimes used to refer to fully flexible switches, but it is also used to refer to switches that have the capability to connect each and every input to one (and only one) output. For large switches, a Clos network may be appropriate. A Clos network is a multistage switch. One option is to construct a Clos network from a plurality of crossbar switches. A Clos network can typically connect each and every input to one output without restriction. It may also be capable of connecting an input to multiple outputs, although this may not always be possible, depending on the connectivity required.

Figure 2:
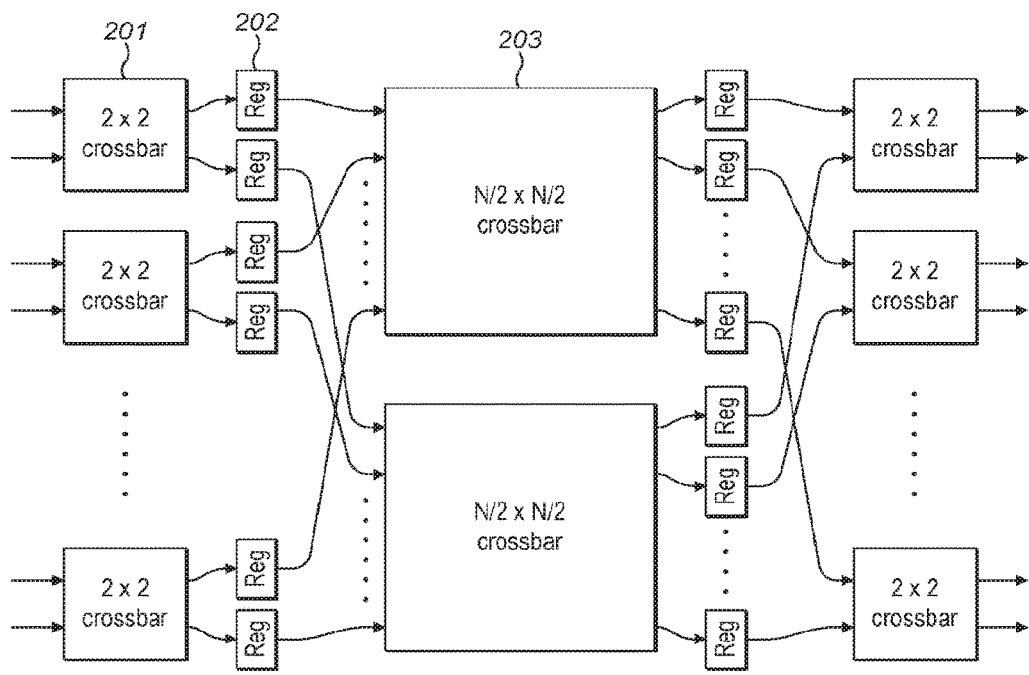
FIG. 2 shows an example of a routing network.

An example of a suitable switch for implementing a routing network is shown in FIG. 2. The figure shows an N×N Clos network in which at least the two outer stages of the network are implemented by a 2×2 crossbar switch (201). The inner part of the network is shown as being implemented by two N/2 crossbar switches (203). These larger crossbar switches may be "nested", e.g. they may themselves be Clos networks implemented by multiple stages of crossbar switches (or some other switch). The switch is pipelined, as indicated by registers 202. The registers are configured to hold the thread data from one clock cycle to the next.

An advantage of pipelining the routing network is that it enables long datapaths to be broken up into smaller sections. These smaller sections can be travelled more quickly, so journeys along them can be accommodated in a single clock cycle even with a fast clock. One option is to have registers at all levels of a nested, multistage switch (so that each stage of the switch represents a section of the pipeline). In practice, however, this may be unnecessary as distances in the inner stages of the switch are likely to be much shorter and are therefore unlikely to constrain the clock speed. Therefore, a single pipeline section may comprise more than one of the inner stages of a multistage switch, so registers are not required at every stage of the switch.

Figure 3:
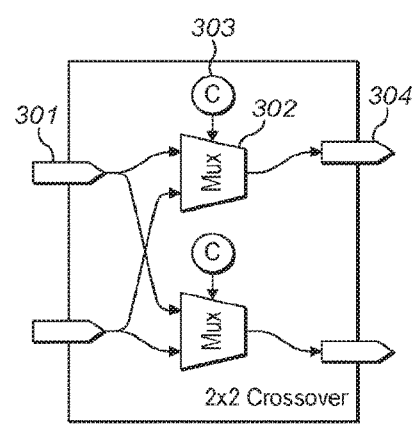
FIG. 3 shows an example of a crossbar switch.

An example of a 2×2 crossbar switch is shown in FIG. 3. The switch is arranged to receive two inputs 301 and output two outputs 304. The switch comprises two multiplexors 302. Each multiplexor receives each of the two inputs and selects one as an output. Each multiplexor is controlled by configuration instance bits 303 to a select a particular one of its inputs as its output. The configuration instance therefore controls the mapping of inputs 301 to outputs 304. A 2×2 crossbar is a simple example but it can be seen that by building up layers of 2×2 crossbars it is possible to construct a flexible routing network that can take a plurality of inputs and route them to a plurality of outputs. Thus the inputs can be delivered to the appropriate location in the circuit for further processing.

2×2 crossbars are just one example of a crossbar switch. Other sizes of crossbar can also be used (e.g. 3×3, 4×4, or larger sizes). A multistage switch may also use different sizes of crossbar in different stages.

Execution Units

An execution unit can be designed to be capable of performing a set of operations, including but not limited to, arithmetic, logical or shift operations, or memory read or write operations. The execution unit can use bits from the configuration instance in addition to bits from its data inputs (e.g. a thread's control values) to determine what operation it will perform for a particular thread. Some execution units may have different inherent capabilities from other execution units, e.g. they may be capable of performing operations that others of the executions units cannot. The number and capabilities of execution units can be tailored to suit a specific application.

Figure 4:
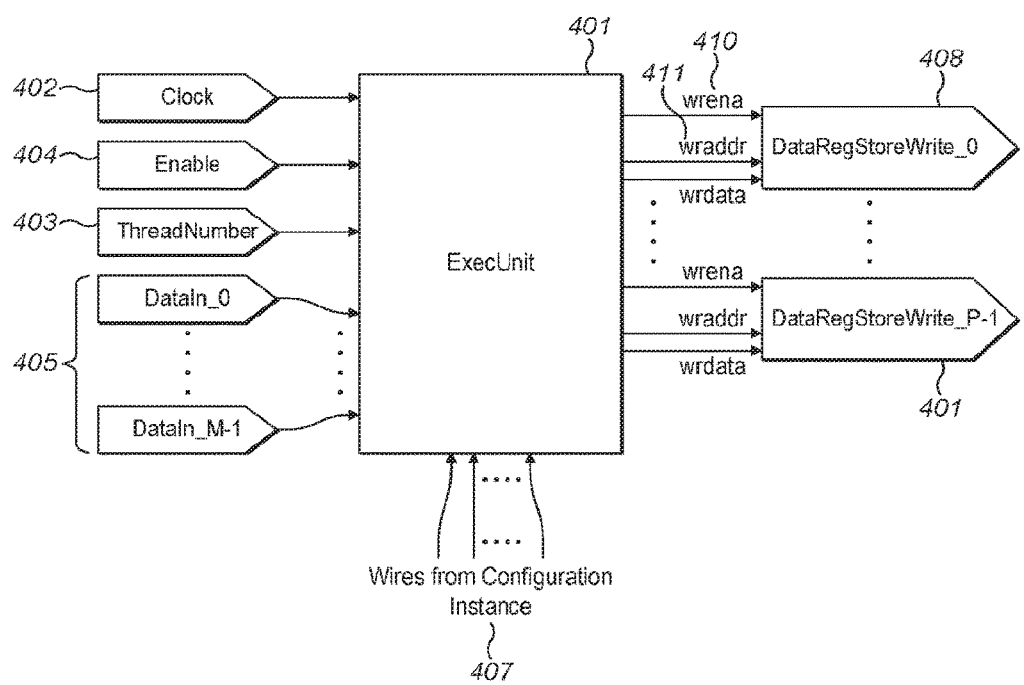
FIG. 4 shows an example of an execution unit.

An example of an execution unit is shown in FIG. 4. The execution unit 401 is configurable to perform an operation in dependence on configuration instance bits 407. It is the configuration instance bits that determine how the execution unit operates on the data. The execution unit also comprises data inputs 405. Typically these inputs receive the thread data that have been routed to the execution unit by the data routing circuit. Some of these inputs may also have a bearing on how the execution unit operates. The execution unit also receives a clock signal 402 and a thread number 403. The clock signal controls the pipeline. The thread number identifies the thread that the execution unit is currently processing. The final input 404 enables register writes, and will be described in more detail below.

The execution unit outputs data for writing to its dedicated register stores (408, 409). The output data represents the result of the operation that the execution unit has performed on its inputs. Each data output 412 is preferably provided with two accompanying outputs: a write enable 410 and a write address 411. The write enable 410 is set by the input 404 that enables register writes. Data may only be written to the registers when the write enable is held at an appropriate value (typically either one or zero). Write operations are disabled if the write enable is not at the appropriate value. This can be used when a register location is found to be invalid, to inhibit all register writes until the location is valid once more (this is described in more detail in the "pipeline" section below). The write address 411 is usually a function of the thread number and some configuration instance bits.

Some examples of particular execution units are shown in FIGS. 5 to 10.

Figure 5:
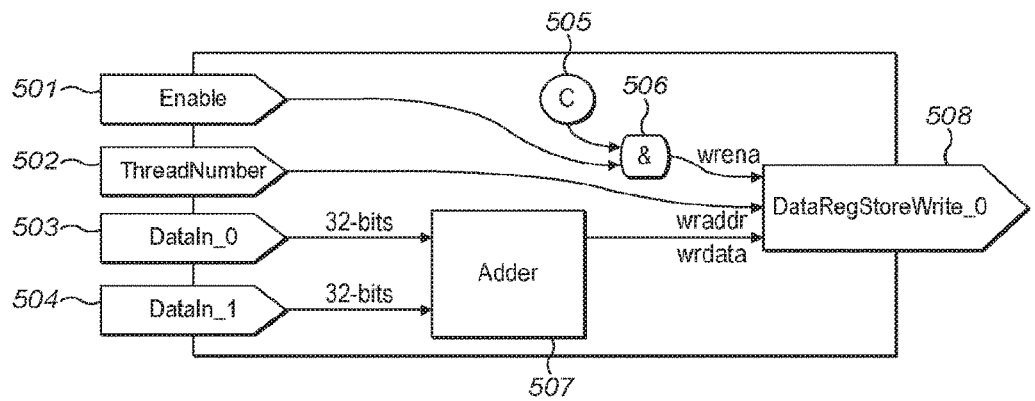
FIG. 5 shows an example of an execution unit configured as an adder.

FIG. 5 shows an execution unit that is configured as a simple adder. The execution unit comprises inputs for enabling writes 501 and identifying the thread number 502. The execution unit also comprises inputs for the data to be added 503, 504. In this example the execution unit can only perform addition (507). One configuration instance bit (505), which is derived from the configuration instance, determines if the result of the adder is written to the register store. The input enabling register writes, which is driven high when any value in the current thread was not valid, can also prevent the result of the adder being written. The output of the execution unit 508 outputs write data, a write address and the write enable for a register store.

Figure 6:
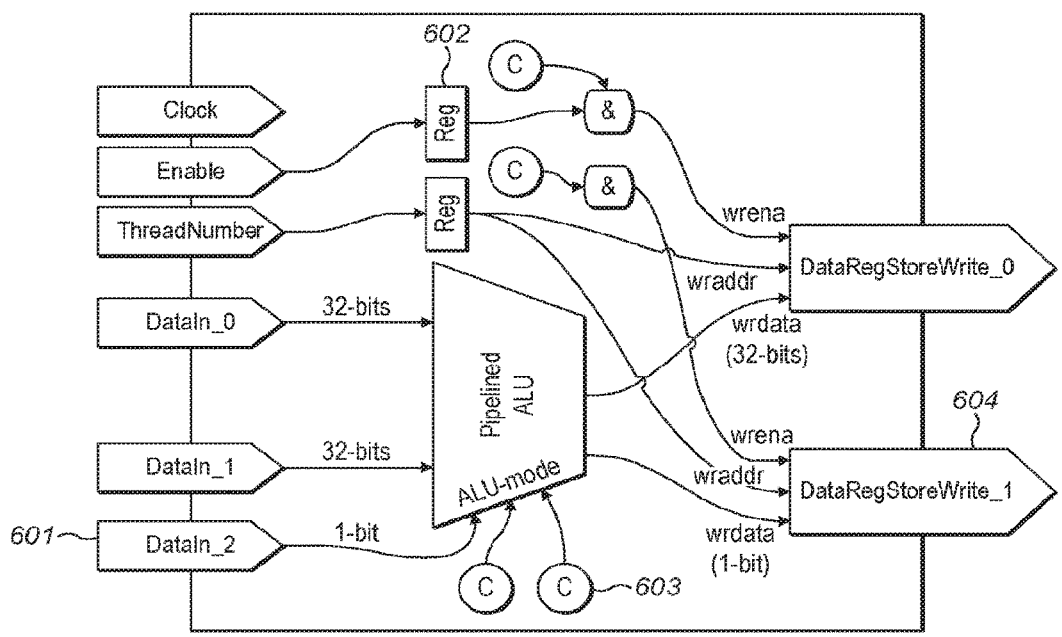
FIG. 6 shows an example of an execution unit configured as a pipelined ALU.

FIG. 6 shows an execution unit configured as a pipelined ALU. In this more complicated example the execution unit can perform a number of different operations. A number of configuration instance bits, as well as bits from input 601, control what the ALU does (603). For example, in one configuration the ALU may operate as a multiplier, in another configuration the ALU may perform an Add using the control input as a carry bit, and in another configuration the control input may select whether the ALU performs an Add or a Subtract. Registers 602 are provided to pipeline the other inputs to match the ALU pipeline. The ALU produces output 604 as well as a data value. As an example, this 1-bit output may be high when the ALU result is zero.

Figure 7:
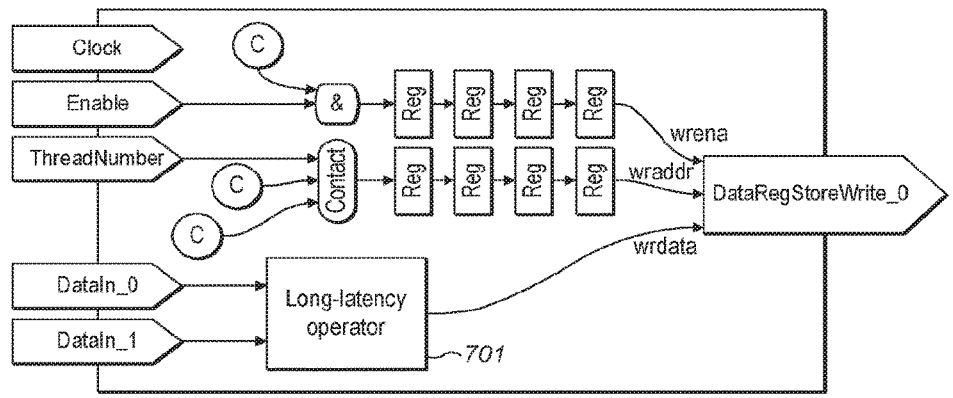
FIG. 7 shows an example of a long-latency execution unit.

FIG. 7 shows an execution unit with a long latency operator 701. In this example multiple registers 702 are provided to pipeline the write enable and write address values. These values will propagate through the registers at each cock cycle, enabling a new thread to enter the execution unit and start the long-latency operation at each clock cycle. The number of registers preferably matches the latency of the operation. The operator 701 may or may not be pipelined. Some operators will not require pipelining because the part of the operation that is long-latency will not be performed by the operator itself. For example, the operation may be a read or write operation to external memory, in which case the latency will be associated with getting access to that memory via the system bus.

Figure 8:
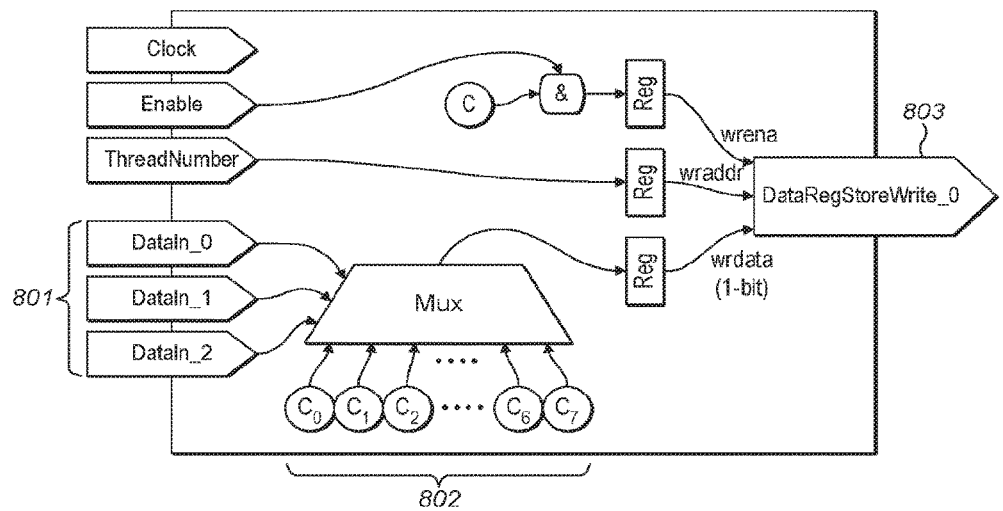
FIG. 8 shows an example of an execution unit for setting a 'configuration instance identifier' for a thread.

FIG. 8 shows an example of an execution unit for changing the configuration instance identifier that a thread will use on the next pass through the circuit. In this example the selection is controlled by three control bits 801 that select one of eight configuration instance identifiers 802. The execution unit comprises output 803 for storing the selected configuration instance identifier.

Figure 9:
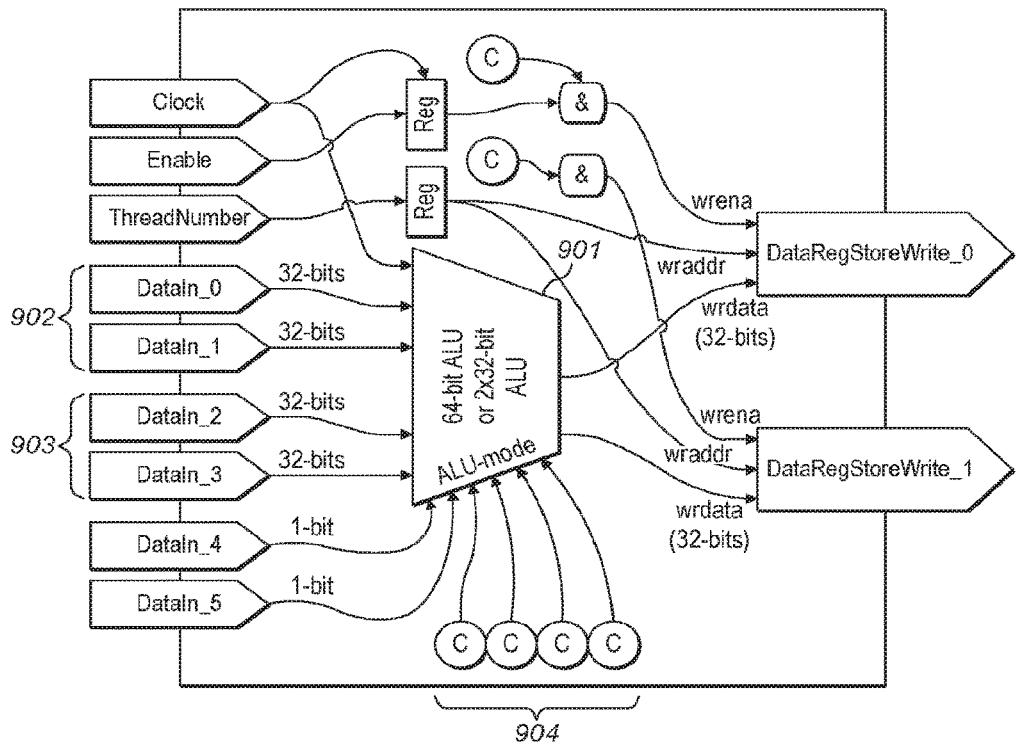
FIG. 9 shows an example of a fracturable execution unit.
Figure 10:
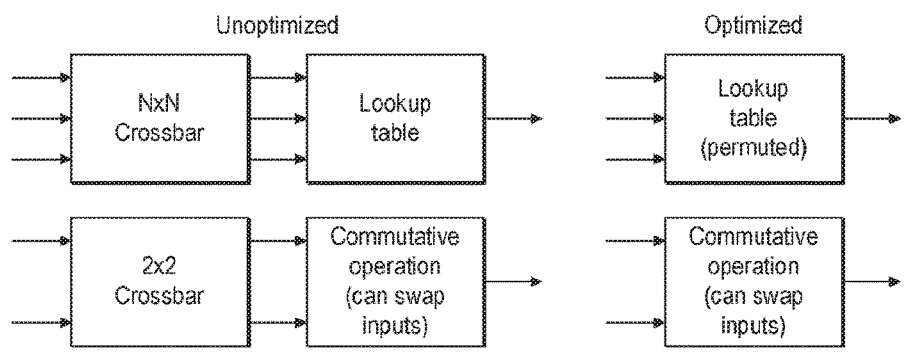
FIG. 10 shows two examples of optimised look-up tables.

Execution units may also be fracturable, i.e. they may be capable of being split into smaller, individually executable units depending on the requirements of the thread. An example is shown in FIG. 9. The execution unit in FIG. 9 comprises a 64-bit ALU 901 that is fracturable into two 32-bit ALUs. The inputs 902, 903 may be used for two pairs of 32-bit values or one pair of 64-bit values. The configuration instance bits set whether the ALU operates as a 64-bit ALU or as two 32-bit ALUs. One advantage of fracturable execution units is that they may be cheaper to implement than two or more individual units.

Some execution units conventionally require inputs to be presented in a particular order. Preferably the execution unit are configured, where possible, so that the order of the inputs does not matter. Two examples include the look-up tables shown in FIG. 10. The look-up tables can be configured to be insensitive to the order that the inputs are presented, which may permit some switches to be removed from the routing network.

Pipeline

The time it takes for instructions to complete depends on the largest number of pipeline stages between any register store read and its corresponding register store write (which will be denoted "p") and the clock frequency of the processor (denoted "f"). The latency per instruction is then p/f. However, the pipeline can process an instruction from p or more different threads every clock cycle. Threads are continuously being cycled, one being issued into the pipeline every clock cycle.

If at any time a value read from a register store is deemed to be not valid, then that thread will be prevented from writing to any register stores or changing its configuration instance identifier. Hence the thread is unable to change any state that is visible to that thread, so that when it is reissued into the pipeline it will resume from the same state. Preferably the circuit is configured so that each thread only accesses its own register stores (as described above). All other threads then progress through the pipeline unaffected provided their values read are valid, independent of whether any other threads encountered invalid values. Invalid register values arise from execution units with variable latency, and hence eventually invalid register values will become valid, and a thread that may have been previously prevented from updating state may now be able to do so. In this way, individual threads may be considered to be 'stalled' even though the pipeline itself continues to propagate values.

The user has no visibility of the pipeline registers. This allows programs to run on different circuits designed according to the principles described herein without having to be modified, even if those circuits have different pipelines. The only difference will be in the length of time it takes each instruction to complete Configuration Instances A set of configuration instances reside in on chip memory. In one embodiment of this invention that configuration instance memory could be accessed by an external processor. Individual configuration instances can be loaded by writing to the configuration instance memory. If configuration memory can be read and written in the same clock cycle, then the threads can continue to progress through the pipeline whilst a configuration instance is being loaded. Configuration instances being used by any thread in the pipeline should not be loaded. This can be enforced by an operating system or by some extra hardware to monitor all configuration instance identifiers in use.

One configuration instance could cause no register stores to be changed and no memory accesses to be made. This 'null' configuration instance could be used for slots in the pipeline when threads are inactive (e.g. upon start-up).

In one embodiment of the invention the circuits for particular execution units or parts of the routing could be changed dynamically. An operating system would have to be configured to ensure that no thread uses the circuits that are being dynamically changed. An example of a technology that is capable of dynamically changing circuits is an FPGA. Typically this type of reprogramming will involve downloading a program file from off-chip to reconfigure all or part of a circuit. This process will typically take in the order of milliseconds (as opposed to the configuration of the circuit for each thread, which takes in the order of nanoseconds). The delay may be justified if the circuit is required to perform some specialist processing for a time, such as encryption or some other intensive processing operation. The circuit described herein is particularly suitable for this type of dynamic reconfiguration because the execution units are self-contained. They can be changed without needing to alter the structure of the surrounding circuitry.

The specific examples described above may be altered in various ways while still falling within the scope of the invention. For example, a circuit described above enables a thread to alter its configuration instance by changing the configuration instance identifier it will use on its next pass through the circuit or by writing control data. Other possibilities that could be implemented in the future include allowing threads to change the configuration instance identifier that will be applied to another thread, or by allowing threads to write to the configuration instances memory directly.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A pipelined routing network comprising a multistage switch, wherein:
   each routing stage of the multistage switch comprises one or more switches, each switch having multiple inputs and multiple outputs and being configurable to connect each input to an output;
   a pipeline section is formed from the switches comprised in one or more routing stages of the multistage switch, a pipeline section comprising switches from an inner routing stage of the multistage switch being formed from switches from a different number of stages of the multistage switch than a pipeline section comprising switches from an outer routing stage of the multistage; and
   the pipelined routing network is configured such that a thread being routed through the pipelined routing network is caused to propagate from one pipeline section to the next at each clock cycle.

2. A pipelined routing network as claimed in claim 1, a pipeline section comprising switches from an inner routing stage of the multistage switch being formed from switches comprised in more stages of the multistage switch than a pipeline section comprising switches from an outer routing stage of the multistage switch.

3. A pipelined routing network as claimed in claim 1, the pipelined routing network comprising, in each pipeline section, one or more registers that are configured to store values output by switches comprised in that pipeline section at the end of each clock cycle.

4. A pipelined routing network as claimed in claim 3, wherein each of the one or more registers is connected to an output of a switch in the multistage switch that corresponds to an output of a pipeline section.

5. A pipelined routing network as claimed in claim 1, the pipelined routing network comprising a plurality of network inputs and a plurality of network outputs and being configurable to connect each network input to a network output.

6. A pipelined routing network as claimed in claim 5, the pipelined routing network being capable of connecting any network input to any network output.

7. A pipelined routing network as claimed in claim 5, the pipelined routing network being capable of connecting any network input to any one or more of the network outputs.

8. A pipelined routing network as claimed in claim 1, the outputs of the configurable routing network being connected to inputs of execution units.

9. A pipelined routing network as claimed in claim 8, switches in every routing stage of the multistage switch comprising the same number of inputs and outputs.

10. A pipelined routing network as claimed in claim 8, switches comprised in one routing stage of the multistage switch comprising a different number of inputs and outputs from switches comprised in another stage.

11. A pipelined routing network as claimed in claim 1, the pipelined routing network comprising a Clos network.

12. A pipelined routing network as claimed in claim 1, the pipelined routing network comprising one or more crossbar switches.

13. A pipelined routing network as claimed in claim 1, the pipelined routing network being non-blocking.

14. A pipelined routing network as claimed in claim 1, the pipelined routing network being fully configurable or partially configurable.

15. A method for routing threads through a pipelined routing network that comprises a multistage switch in which each pipeline section is formed from switches that are comprised in one or more routing stages of the multistage switch, the method comprising:

causing each thread to propagate from one pipeline section to the next at each clock cycle; and during a clock cycle, causing a thread that is propagating through a pipeline section that comprises switches from an inner routing stage of the multistage switch to propagate through a different number of routing stages of the multistage switch during the clock cycle than a thread that is propagating through a pipeline section that comprises switches from an outer stage of the multistage switch.

16. A pipelined routing network comprising a multistage switch in which each pipeline section is formed from switches that are comprised in one or more routing stages of the multistage switch, wherein:

each routing stage of the multistage switch comprises one or more switches, each switch having multiple inputs and multiple outputs and being configurable to connect each input to an output;

switches comprised in one routing stage of the multistage switch comprise a different number of inputs and outputs from switches comprised in another routing stage of the multistage switch; and the pipelined routing network is configured such that a thread being routed through the pipelined routing network is caused to propagate from one pipeline section to the next at each clock cycle.

17. A pipelined routing network as claimed in claim 16, the switches comprised in an inner routing stage of the multistage switch comprising more inputs and outputs than a switch comprised in an outer routing stage of the multistage switch.

18. A pipelined routing network as claimed in claim 16, the pipelined routing network comprising, in each pipeline section, one or more registers that are configured to store values output by switches comprised in that pipeline section at the end of each clock cycle.

19. A pipelined routing network as claimed in claim 16, the pipelined routing network comprising a plurality of network inputs and a plurality of network outputs and being configurable to connect each network input to a network output.

20. A method for routing threads through a pipelined routing network that comprises a multistage switch in which each pipeline section is formed from switches that are comprised in one or more routing stages of the multistage switch, the method comprising:

causing each thread to propagate from one pipeline section to the next at each clock cycle; and during a clock cycle, causing a thread that is propagating through a different routing stage of the multistage switch than another thread to propagate through a switch comprising a different number of inputs and outputs than a switch through which the other thread is propagating.

* * * * *

UNITED STATES PATENT AND TRADEMARK OFFICE
CERTIFICATE OF CORRECTION

PATENT NO.        : 10,275,390 B2
APPLICATION NO.   : 15/600508
DATED             : April 30, 2019
INVENTOR(S)       : Paul Metzgen Page 1 of 1

It is certified that error appears in the above-identified patent and that said Letters Patent is hereby corrected as shown below:

In the Claims

Column 12, Line 17, Claim 1, after "multistage" insert --switch--.

Signed and Sealed this
Second Day of July, 2019

Andrei Iancu
*Director of the United States Patent and Trademark Office*